(12) United States Patent
Nakanishi

(10) Patent No.: US 10,549,433 B2
(45) Date of Patent: Feb. 4, 2020

(54) ROBOT DEVICE

(71) Applicant: MITSUBA Corporation, Gunma (JP)

(72) Inventor: Hitoshi Nakanishi, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 15/740,810

(22) PCT Filed: Sep. 6, 2016

(86) PCT No.: PCT/JP2016/076113
§ 371 (c)(1),
(2) Date: Dec. 29, 2017

(87) PCT Pub. No.: WO2017/047438
PCT Pub. Date: Mar. 23, 2017

(65) Prior Publication Data
US 2018/0194016 A1    Jul. 12, 2018

(30) Foreign Application Priority Data

Sep. 14, 2015  (JP) .................................. 2015-181061

(51) Int. Cl.
*B25J 17/00* (2006.01)
*B25J 17/02* (2006.01)
(Continued)

(52) U.S. Cl.
CPC ................. *B25J 19/06* (2013.01); *B25J 5/02* (2013.01); *B25J 9/009* (2013.01); *B25J 9/0018* (2013.01); *B25J 9/0051* (2013.01); *B25J 9/0084* (2013.01); *B25J 19/0091* (2013.01); *F16H 21/54* (2013.01); *Y10S 901/15* (2013.01); *Y10S 901/49* (2013.01)

(58) Field of Classification Search
CPC .................................. B25J 9/0084; B25J 5/02
See application file for complete search history.

(56) References Cited

U.S. PATENT DOCUMENTS

| 6,976,821 B2 * | 12/2005 | Zarske ................. B23Q 1/5462 212/317 |
| 2013/0017050 A1 * | 1/2013 | Fukudome ........... B25J 17/0266 414/729 |

(Continued)

FOREIGN PATENT DOCUMENTS

| JP | H05-6220 | 1/1993 |
| JP | 2004-516153 | 6/2004 |

(Continued)

OTHER PUBLICATIONS

"International Search Report (Form PCT/ISA/210) of PCT/JP2016/076113", dated Oct. 25, 2016, with English translation thereof, pp. 1-4.

*Primary Examiner* — Jake Cook
(74) *Attorney, Agent, or Firm* — JCIPRNET

(57) ABSTRACT

A parallel robot is equipped with: a base plate that is provided so as to be capable of sliding movement; three link mechanisms disposed radially when viewed from the normal direction of the base plate; and three lower motors with reduction gears that are disposed on the base plate and are connected separately to the base ends of the three link mechanisms. A plurality of parallel robots are disposed so that the respective orientations of the three link mechanisms alternate.

8 Claims, 8 Drawing Sheets

(51) Int. Cl.
*B25J 18/00* (2006.01)
*B25J 19/06* (2006.01)
*B25J 9/00* (2006.01)
*B25J 19/00* (2006.01)
*B25J 5/02* (2006.01)
*F16H 21/54* (2006.01)

(56) References Cited

U.S. PATENT DOCUMENTS

2014/0230594 A1* 8/2014 De Bie ................ B25J 18/00
 74/490.01
2015/0217318 A1 8/2015 Letard et al.
2016/0332295 A1* 11/2016 Brog Rdh .............. B25J 9/0051

FOREIGN PATENT DOCUMENTS

| | | |
|---|---|---|
| JP | 2014-039977 | 3/2014 |
| JP | 2014-176938 | 9/2014 |
| JP | 2015-523224 | 8/2015 |

* cited by examiner

ROBOT DEVICE

CROSS-REFERENCE TO RELATED APPLICATION

This application is a 371 application of the International PCT application serial no. PCT/JP2016/076113, filed on Sep. 6, 2016, which claims the priority benefit of Japan application no. 2015-181061, filed on Sep. 14, 2015. The entirety of each of the above-mentioned patent applications is hereby incorporated by reference herein and made a part of this specification.

FIELD OF THE INVENTION

The invention relates to a robot device.
Priority is claimed on Japanese Patent Application No. 2015-181061, filed Sep. 14, 2015, the content of which is incorporated herein by reference.

DESCRIPTION OF RELATED ART

Robot devices which are disposed on production lines and automatically assemble components of products are known from the past. Among robot devices, there are parallel robots that are used to three-dimensionally convey and assemble workpieces, which are product components.

A parallel robot comprises a base portion (a base member), three link mechanisms which are disposed on a bottom side of the base unit in a circumferential direction with equal intervals therebetween, three driving units (linking motor devices) which are disposed on the base unit and connected to the three link mechanisms respectively on a base end side, and a movable unit which is provided on a distal end side of the three link mechanisms and connected to the distal end thereof such that the movable unit can freely turn. The three link mechanisms are disposed in the circumferential direction with equal intervals therebetween and provided radially (in a trident shape) when viewed in the direction of a normal of the base unit (refer to, e.g., Patent Document 1).

PRIOR ART LITERATURE

Patent Literature

[Patent Literature 1]
Japanese Patent Publication No. 2014-39977

SUMMARY OF THE INVENTION

Technical Problem

However, there are cases in which a plurality of parallel robots are disposed and used on a production line in order to improve production capabilities. In this case, if intervals between adjacent parallel robots are set to be unnecessarily wide, the production line is lengthened and conveyance take times increase. For these reasons, it is desirable to set an interval between adjacent parallel robots to be as narrow as possible.

However, if an interval between adjacent parallel robots is set to be narrow, there is a possibility of link mechanisms of the respective parallel robots interfering with each other.

One of the embodiments of the invention provides a robot device in which link mechanisms of parallel robots can be prevented from interfering with each other and also an interval between adjacent parallel robots is able to be as narrow as possible.

Solution to Problem

According to a first aspect of one of the embodiments of the invention, a robot device comprises a plurality of parallel robots configured to be capable of slidably moving along a same travel region, and each of the parallel robots comprises a base portion which is configured to be capable of slidably moving, three link mechanisms which are disposed radially when viewed from a normal direction of the base portion, and three driving units which are disposed in the base portion and separately connected on base end sides of the three link mechanisms, and the plurality of parallel robots are disposed such that orientations of the three link mechanisms alternate.

With this configuration, even when the plurality of parallel robots are disposed in the sliding direction in the same travel region, interference between the link mechanisms of each of the parallel robots can be prevented while an interval between adjacent parallel robots is set to be as narrow as possible.

According to a second aspect of one of the embodiments of the invention, in the robot device according to the first aspect of one of the embodiments of the invention, further comprises two slide rails extending in a same direction and disposed parallel to each other in the travel region, at least one of the base portion of the parallel robots is respectively configured to be capable of slidably moving on each of the two slide rails, and only the parallel robots with the three link mechanisms having the same orientation are provided on the same slide rail.

By providing the two slide rails in the same travel region as described above, driving control of the plurality of parallel robots can be simplified. In addition, since only the parallel robots having the same orientation are provided on the same slide rail, if the orientations of the plurality parallel robots alternate, an interval between the parallel robots on the same slide rail can be set to be wide. Since this interval can be set to be wide, assembly workability of the robot device can be improved accordingly.

According to a third aspect of one of the embodiments of the invention, in the robot device according to the first or the second aspect of one of the embodiments of the invention, one of the three link mechanisms is disposed in a direction orthogonal to a slide-movement direction of the parallel robots in the travel region when viewed in the normal direction of the base portion.

With this configuration, the interval between the adjacent parallel robots can be set to be narrow more effectively. In addition, interference of the link mechanisms of each of the parallel robots can be prevented more effectively.

According to a fourth aspect of one of the embodiments of the invention, in the robot device according to any one of the first to the third aspects of one of the embodiments of the invention, further comprising a stopper configured on the base portion for preventing the link mechanisms of the parallel robots that are adjacent to one another from coming in contact with each other.

With this configuration, the stopper can have a failsafe function and interference of the link mechanisms of each parallel robot can be reliably prevented.

According to a fifth aspect of one of the embodiments of the invention, in the robot device according to the fourth aspect of one of the embodiments of the invention, the stopper is a safety bar extending from one to another base portion that are adjacent with each other, and distal ends of the safety bars of the parallel robots that are adjacent to each other abut against each other.

With this configuration, interference of the link mechanisms of each of parallel robots can be reliably prevented while a configuration of the stopper is simplified.

Advantageous Effects of Invention

According to the above-described robot device, even when a plurality of parallel robots are disposed in the sliding direction of a travel area, interference of the link mechanisms of each of the parallel robots can be prevented while the interval between the adjacent parallel robots is set as narrow as possible.

DESCRIPTION OF THE EMBODIMENTS

Next, embodiments of the invention will be described with reference to the drawings.
(Robot Device)

Figure 1:
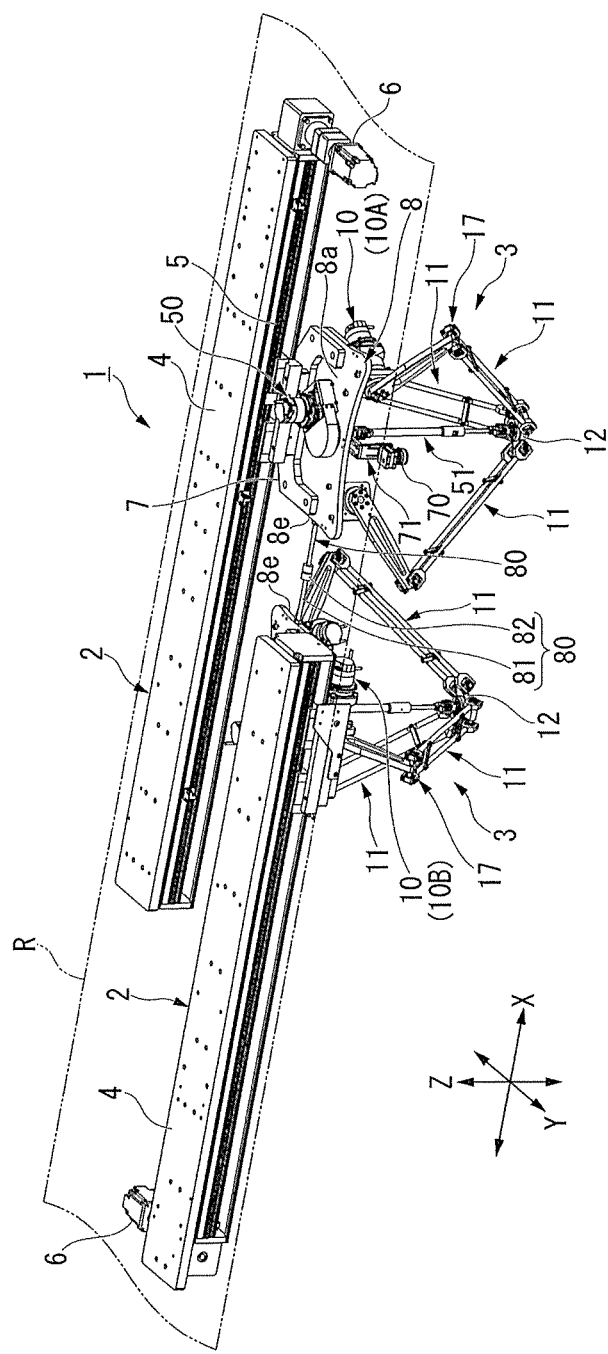
FIG. 1 is a perspective diagram of a robot device according to an embodiment of the invention.

FIG. 1 is a perspective diagram of a robot device 1.

As shown in the drawing, the robot device 1 is a device for three-dimensionally conveying and assembling workpieces, which are product components. The robot device 1 includes two slide rails 2 disposed within a travel region R extending in one direction (the left-right direction of FIG. 1) and two parallel robots 3 attached to each of the slide rails 2 and disposed side by side in one direction.

Note that the travel region R is set along a production line (assembly line). In addition, in the following description, one direction may be referred to as an X direction, a direction perpendicular thereto may be referred to as a Z direction, and a direction orthogonal to the X and Z directions may be referred to as a Y direction. Furthermore, in the following description, an upper side in the vertical direction in an installation state of the robot device 1 will be simply referred to as an upper side and a lower side in a vertical direction will be referred to as a lower side.

The two slide rails 2 are disposed to extend along the X direction and be parallel with each other. Each slide rail 2 includes a rail main body 4, a slider 5 provided to be freely slidable and movable along the rail main body 4, and a slider motor with reduction gear 6 that drives the slider 5.

Mounting bases 7 are provided in the sliders 5 of the two slide rails 2 such that the mounting bases project to face each other. Each of the mounting bases 7 has a base plate 8 of the parallel robot 3 mounted thereon, which will be described below.
(Parallel Robot)

Figure 2:
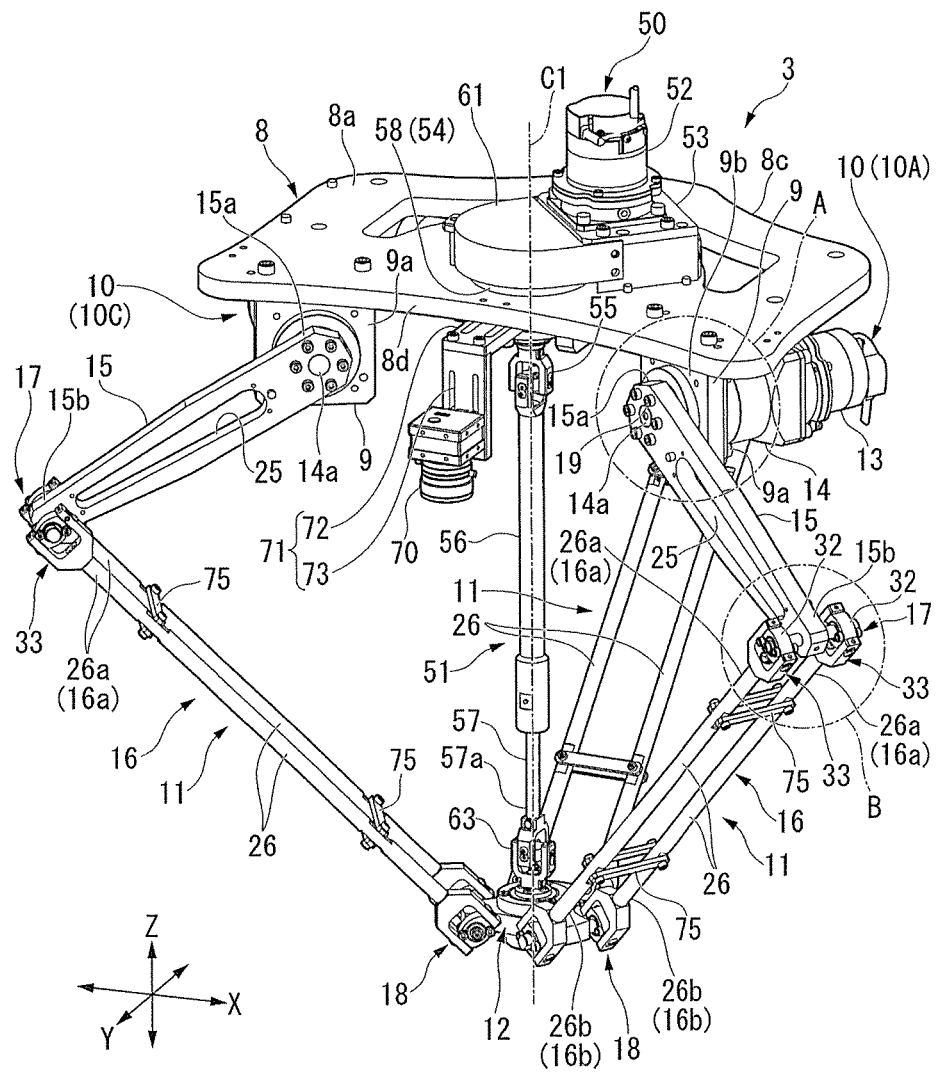
FIG. 2 is a perspective diagram of a parallel robot according to an embodiment of the invention viewed from obliquely above.
Figure 3:
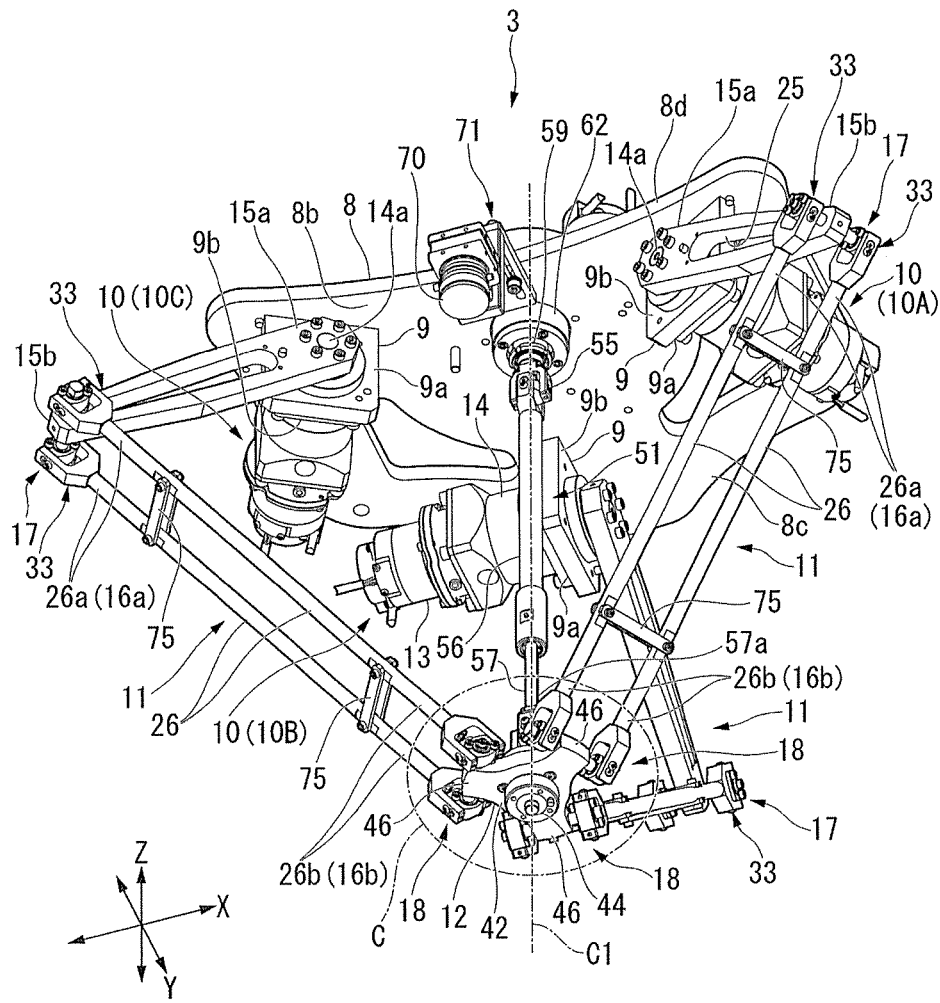
FIG. 3 is a perspective diagram of the parallel robot according to the embodiment of the invention viewed from obliquely below.

FIG. 2 is a perspective diagram of the parallel robot 3 viewed from obliquely above, and FIG. 3 is a perspective diagram of the parallel robot 3 viewed from obliquely below.

As shown in FIG. 1 to FIG. 3, the parallel robot 3 is constituted mainly by the planar base plate 8 mounted on the mounting base 7, an upper motor with reduction gear 50 fixed to an upper surface 8a of the base plate 8, a rotational driving mechanism 51 connected to the upper motor with reduction gear, three lower motors with reduction gear 10 (10A to 10C) fixed to a lower surface 8b of the base plate 8 via brackets 9, three link mechanisms 11 each of which are separately connected to the lower motors with reduction gear 10, and a movable plate 12 connected to lower portions of the three link mechanisms 11 and a lower portion of the rotational driving mechanism 51.

The base plate 8 is formed in a substantially rectangular shape such that a surface direction corresponds to an X-Y plane and the base plate is slightly longer in the X direction. More specifically, a side 8c of the base plate 8 in the lateral direction is formed such that the side gradually projects to an outward side in the Y direction toward the center in the longitudinal direction. Meanwhile, another side 8d of the base plate 8 in the lateral direction is formed such that the side is slightly recessed to an inward side in the Y direction. Note that details of a formation position of the other side 8d of the base plate 8 will be described below.

In addition, the mounting base 7 of the robot device 1 is mounted on the upper surface 8a of the base plate 8 on the side 8c side. The mounting base 7 provided on the slide rail 2 is formed in a substantially C shape when viewed from the Z direction to avoid the upper motor with reduction gear 50 that is fixed to the upper surface 8a of the base plate 8.

In addition, as shown in FIG. 1, in the two base plates 8 mounted on the slide rails 2 respectively, stoppers 80 are provided on short sides 8e, which face each other in the X direction, to prevent the parallel robots 3 from interfering with each other.

Each of the stoppers 80 is constituted by a rod-shaped safety bar body 81 projecting from the short side 8e of the base plate 8 in the X direction and a cylindrical abutting portion 82 which is provided at a distal end of the safety bar body 81 such that the abutting portion is integrated with the safety bar body and has a larger diameter than the safety bar body 81. A length of the safety bar body 81 is set to have a length in which the abutting portions 82 abut against each other before the two parallel robots 3 interfere with each other.

The upper motor with reduction gear 50 is provided to drive the rotational driving mechanism 51. The upper motor with reduction gear 50 is constituted by a motor portion 52 and a speed reducing portion 53 which reduces and outputs a speed of a rotation force of the motor portion 52. The speed reducing portion 53 is connected to the rotational driving mechanism 51.

The rotational driving mechanism 51 includes a rotation body 54 to which power from the upper motor with reduction gear 50 is transmitted, a linear motion guide 56 which is connected to the rotation body 54 via a universal joint 55, and a rotation arm 57 which is connected to the linear motion guide 56 such that the rotation arm can slide thereon but is not capable of rotating relative thereto. The rotation body 54 is integrally formed with a spur gear portion 58 that can be engaged with the speed reducing portion 53 and a column portion 59 which extends from a rotation center of the spur gear portion 58 downward in the Z direction.

The spur gear portion 58 is disposed on the upper surface 8a of the base plate 8. In addition, the spur gear portion 58 is disposed such that a rotation center thereof is positioned at a center of the longitudinal direction (the X direction) of the base plate 8 slightly toward the other side 8d of a center of the lateral direction (the Y direction).

Note that, in the following description, the rotation center of the spur gear portion 58 (the rotation body 54) will be referred to as C1 and the circumference of the rotation center C1 will be referred to as a circumferential direction.

In addition, the spur gear portion 58 is covered by a cover 61. A rotation position detection unit (not illustrated) for detecting a rotation position of the spur gear portion 58 is provided inside the cover 61.

The column portion 59 of the rotation body 54 is freely rotatably supported by a housing 62 provided on a lower surface 8b of the base plate 8. In addition, a lower end of the column portion 59 slightly projects downward via the housing 62. The linear motion guide 56 is connected to the lower end of the projecting the column portion 59 via the universal joint 55.

The linear motion guide 56 is formed in a cylinder shape. The linear motion guide 56 has a spline, which is not illustrated, formed on an inner peripheral surface thereof. In addition, the rotation arm 57 is inserted into the linear motion guide 56 from below.

A spline, which is not illustrated, is formed on an outer peripheral surface of the rotation arm 57 such that the spline corresponds to the spline of the linear motion guide 56. That is, the splines of the linear motion guide 56 and the rotation arm 57 are fitted to each other. Accordingly, rotation of the rotation arm 57 with respect to the linear motion guide 56 is restricted, and expanding and contracting movements of the rotation arm 57 with respect to the linear motion guide 56 are possible. Furthermore, a movable plate 12 is connected to a lower end 57a of the rotation arm 57 via a universal joint 63.

Figure 4:
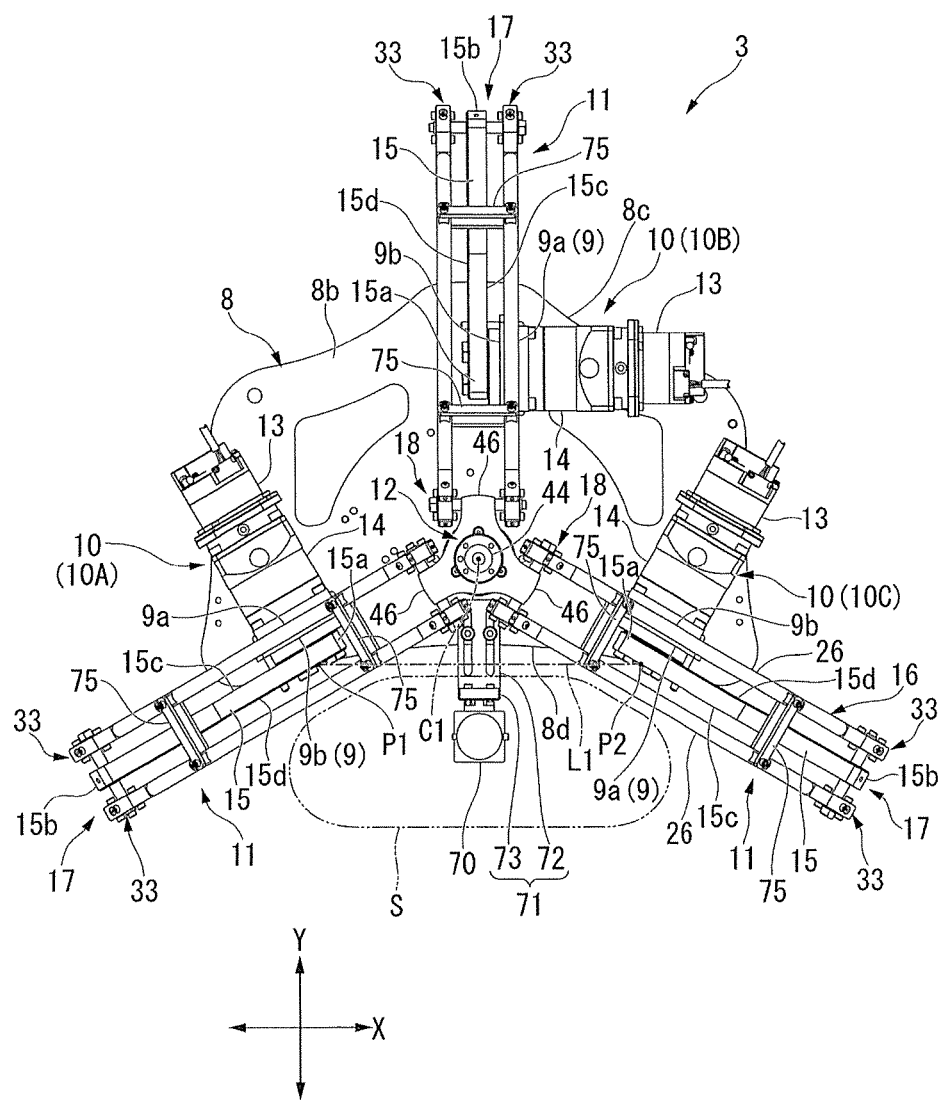
FIG. 4 is a plan view of the parallel robot according the embodiment of the invention viewed from immediately below.

FIG. 4 is a plan view of the parallel robot 3 viewed from immediately below.

Meanwhile, the three lower motors with reduction gears 10 provided on the lower surface 8b side of the base plate 8 are for separately driving the respective three link mechanisms 11 as shown in FIG. 2 to FIG. 4. The three lower motors with reduction gear 10 include three lower motors with reduction gears 10A to 10C which are a first lower motor with reduction gear 10A, a second lower motor with reduction gear 10B, and a third lower motor with reduction gear 10C.

Note that, since the three lower motors with reduction gears 10A to 10C have the same configuration, the first lower motor with reduction gear 10A, the second lower motor with reduction gear 10B, and the third lower motor with reduction gear 10C will be collectively referred to as the lower motors with reduction gears 10 in the following description unless specified otherwise.

Each of the lower motors with reduction gears 10 is constituted by a motor portion 13 and a speed reducing portion 14 which decelerates and outputs a rotation force of the motor portion 13. As the speed reducing portion 14, for example, a planetary gear speed reducing mechanism is used. For this reason, an output shaft 14a of the speed reducing portion 14 and a rotation shaft of the motor portion 13, which is not illustrated, are disposed on the same linear line. Note that, particularly, although not illustrated, the output shaft 14a is formed in a step shape and a portion on a distal end side thereof forms a reduced diameter portion and a portion on the motor portion 13 side forms an expanded diameter portion in which a diameter thereof is more expanded than the distal end due to a level difference.

Each of the brackets 9 supporting the lower motors with reduction gears 10 configured as described above is formed in a substantially square plate shape, and provided to stand from the lower surface 8b of the base plate 8 downward in the Z direction. The number of brackets 9 is also three so as to correspond to the number of lower motors with reduction gears 10. In addition, the brackets 9 are disposed in a radial form with respect to the rotation center C1 of the base plate 8 with equal intervals therebetween in the circumferential direction when viewed in the Z direction.

Furthermore, end surfaces of the first lower motor with reduction gear 10A and the second lower motor with reduction gear 10B on the speed reducing portion 14 sides are attached to surfaces 9a of two brackets 9 out of the three brackets 9. In addition, an end surface of the third lower motor with reduction gear 10C on the speed reducing portion 14 side is attached to the other surface 9b of one bracket 9 out of the three brackets 9. For this reason, driving shafts (the output shaft 14a and the rotation shaft of the motor portion 13 which is not illustrated) of the lower motors with reduction gears 10 are disposed along an X-Y plane (in the horizontal direction), e.g., in a surface direction of the base plate 8.

Here, the surfaces 9a and the other surfaces 9b of the brackets 9 will be described in detail with reference to FIG. 4.

The surfaces 9a and the other surfaces 9b of the three brackets 9 face the same directions. That is, all surfaces of the three brackets 9 facing in the clockwise direction are set as the surfaces 9a and all surfaces thereof facing in the counterclockwise direction are set as the other surfaces 9b in FIG. 4.

For this reason, the first lower motor with reduction gear 10A and the second lower motor with reduction gear 10B attached on the surfaces 9a of the brackets 9 project from the corresponding brackets 9 in a clockwise direction. Meanwhile, the third lower motor with reduction gear 10C attached on the other surface 9b of the bracket 9 projects from the corresponding bracket 9 in a counterclockwise direction.

Each of the output shafts 14a of the lower motors with reduction gears 10 disposed as described above projects toward the surface opposite to the surface to which the output shaft is attached via penetration holes, which are not illustrated, formed in the brackets 9. That is, the output shafts 14a of the first lower motor with reduction gear 10A and the second lower motor with reduction gear 10B project toward the other surface 9b through the corresponding brackets 9. Meanwhile, the output shaft 14a of the third lower motor with reduction gear 10C projects toward the surface 9a through the corresponding brackets 9.

In addition, the bracket 9 to which the first lower motor with reduction gear 10A is attached and the bracket 9 to which the third lower motor with reduction gear 10C is attached are disposed to be respectively adjacent to the other side 8d of the base plate 8. Furthermore, the bracket 9 to which the first lower motor with reduction gear 10A is attached is disposed such that the other surface 9b of the bracket faces the other side 8d of the base plate 8, and the bracket 9 to which the third lower motor with reduction gear 10C is attached is disposed such that the surface 9a of the bracket faces the other side 8d of the base plate 8.

(Link Mechanism)

In addition, the link mechanisms 11 are attached to each of the output shafts 14a of the lower motors with reduction gear 10 projecting from each bracket 9. Note that, since the link mechanisms 11 have the same configuration, only one link mechanism 11 will be described below, and the two remaining link mechanisms 11 will be denoted by the same reference numeral and will not be described.

Each of the link mechanisms 11 includes a first arm 15 of which a base end 15a is connected to the output shaft 14a, a second arm 16 disposed on a distal end 15b side of the first arm 15, and a first connecting potion 17 connecting the distal end 15b of the first arm 15 to a base end 16a of the second arm 16.

Figure 5:
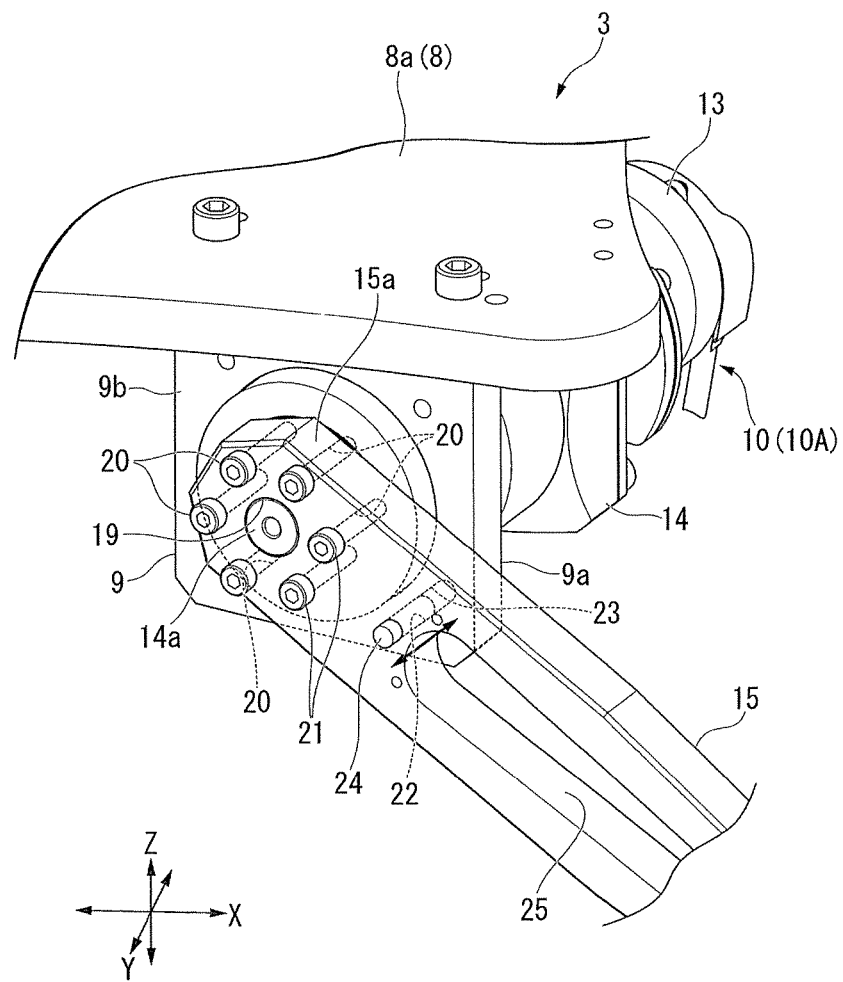
FIG. 5 is an enlarged diagram of an A portion of FIG. 2.

FIG. 5 is an enlarged diagram of an A portion of FIG. 2.

As shown in FIGS. 2, 3, and 5, the first arm 15 is a plate-shaped member and formed such that the first arm gradually tapers off from the base end 15a toward the distal end 15b. In addition, a penetration hole 19 into which a distal end (the reduced diameter portion) of the output shaft 14a of the lower motor with reduction gear 10 can be inserted is formed on the base end 15a side. Furthermore, a plurality of bolt insertion holes 20 are formed around the penetration hole 19 on the base end 15a side of the first arm 15.

In addition, the distal end of the output shaft 14a is inserted into the penetration hole 19, and bolts 21 are inserted into the bolt insertion holes 20. Furthermore, by screwing the bolts 21 into female thread portions (none of which is illustrated) engraved in the expanded diameter portion of the output shaft 14a, the base end 15a of the first arm 15 is fastened and fixed to the output shaft 14a. Accordingly, the output shaft 14a and the first arm 15 are integrated.

Then, each of the first lower motor with reduction gear 10A and the second lower motor with reduction gear 10B is disposed on a side surface 15c of the first arm 15. Meanwhile, the third lower motor with reduction gear 10C is disposed on the other side surface 15d which is opposite to the side surface 15c of the first arm 15. In addition, the three first arms 15 are disposed in a radial shape with respect to the rotation center C1 with equal intervals therebetween in the circumferential direction.

Note that the side surfaces 15c and the other side surfaces 15d of the first arms 15 are similarly configured to the surfaces 9a and the other surfaces 9b of the brackets 9. That is, all surfaces of the three first arms 15 facing in the clockwise direction are set as the side surfaces 15c and all surfaces thereof facing in the counterclockwise direction are set as the other side surfaces 15d in FIG. 4.

Here, if a straight line connecting a point P1 at which the other side surface 15d of the first arm 15 having the first lower motor with reduction gear 10A attached thereto intersects the center of the corresponding output shaft 14a to a point P2 at which the side surface 15c of the first arm 15 having the third lower motor with reduction gear 10C attached thereto intersects the center of the corresponding output shaft 14a is set to L1 (which will be simply referred to as a straight line L1 below), the other side 8d of the base plate 8 is formed on an inward side of the straight line L1, i.e., on the rotation center C1 side as shown in FIG. 4 in detail. In other words, the other side 8d of the base plate 8 is concave toward the rotation center C1 in comparison to other side surfaces as if it were trimmed. This concave place (space) functions as a work space for an operator.

In addition, an arm-side pin insertion hole 22 is formed slightly toward the distal end 15b side of the place at which the bolt insertion holes 20 are formed in the first arm 15 as shown in FIG. 5 in detail. Meanwhile, a bracket-side pin insertion hole 23 is formed at a predetermined position in each of the brackets 9.

These arm-side pin insertion hole 22 and bracket-side pin insertion hole 23 are used to position starting points of the first arms 15 with respect to the output shafts 14a of the lower motors with reduction gears 10. That is, the arm-side pin insertion hole 22 and the bracket-side pin insertion hole 23 communicate with each other, and pins 24 are inserted thereinto to position the starting points of the first arms 15 with respect to the output shafts 14a.

Each of the first arms 15 is fixed to the position of the starting point of one of the output shafts by being fastened and fixed to the output shaft 14a using the bolts 21 with the pin 24 inserted into the position. After the first arm 15 is fixed, the pin 24 is removed from the pin insertion holes 22 and 23. Note that a diameter of each bolt insertion hole 20 formed in the first arm 15 is set to be larger than a screw diameter of each bolt 21. That is, the bolt insertion holes 20 are formed such that the bolts 21 rattle inside the bolt insertion holes 20. This rattling functions as an adjustment allowance for the first atm 15 when the position of the starting point is adjusted.

In addition, an opening portion 25 is formed as a majority portion of the first arm 15 in the center thereof in the longitudinal direction. This opening portion 25 is intended to make the first arm 15 lighter.

The second arm 16 connected to the first arm 15 via the first connection portion 17 has two arm bars 26 each disposed on the side surfaces 15c and 15d of the first arm 15 as shown in FIG. 2 and FIG. 3. The arm bars 26 are integrated with each other by a stay bolt 75 straddling the arm bars 26 with a predetermined gap therebetween. Base ends 26a of the arm bars 26 serve as the base end 16a of the second arm 16.

Figure 6:
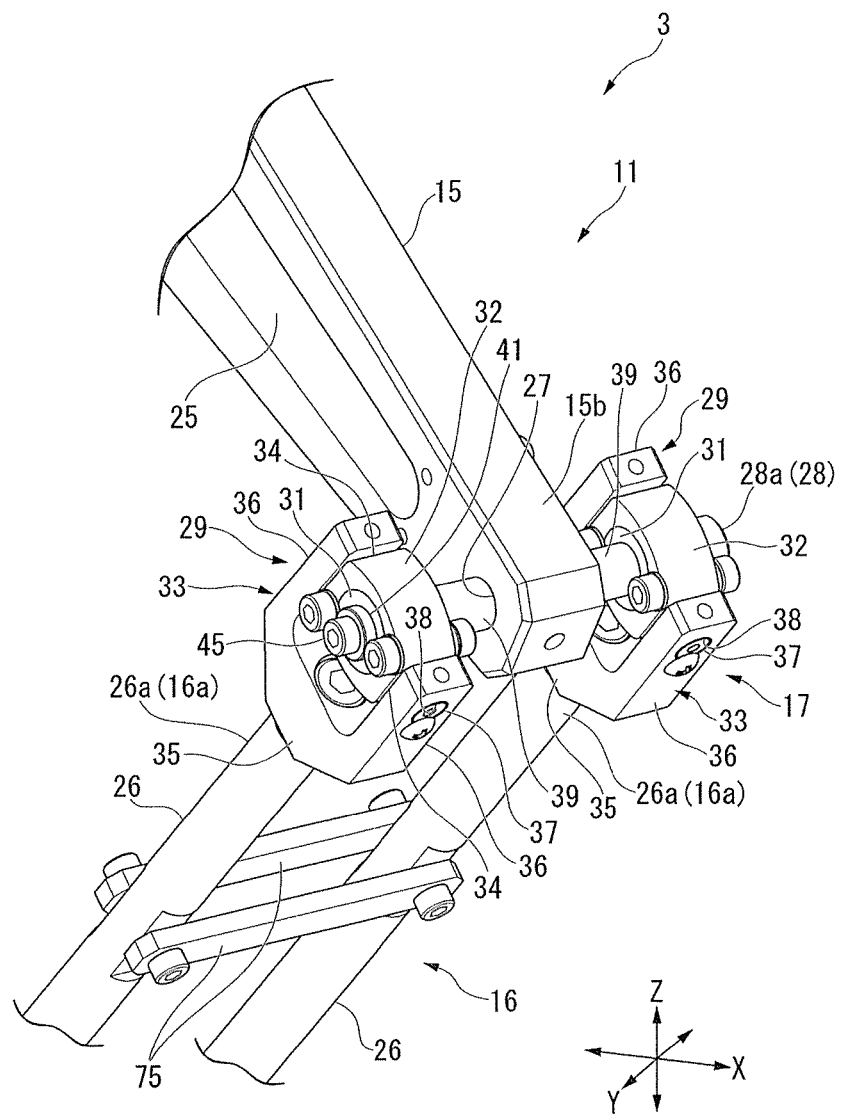
FIG. 6 is an enlarged diagram of a B portion of FIG. 2.

FIG. 6 is an enlarged diagram of a B portion of FIG. 2.

The first connection portion 17 is mainly constituted by a penetration hole 27 formed on the distal end 15b side of the first arm 15 to penetrate the first arm in a thickness direction, a connecting shaft 28 inserted into the penetration hole 27, and two small connection portions 29 each provided at the base ends 26a of the arm bars 26 to be connected to the connecting shaft 28 as shown in the drawing.

The connecting shaft 28 has a head portion 28a formed by expanding a diameter of one end thereof with a level difference and a female screw portion, which is not illustrated, engraved at a distal end of the other end thereof in an axial direction.

Each of the small connection portions 29 includes a ball bearing 31 for supporting the connecting shaft 28 such that the portions can freely rotate, a substantially ring-shaped bearing holder 32 into which the ball bearing 31 fits, and a joint portion 33 which connects the bearing holder 32 and the base end 26a of each arm bar 26 such that the members can freely turn.

Two flat surfaces 34, which are formed through two-side removal processing, are disposed on the outer peripheral surface of the bearing holder 32, facing each other and having the connecting shaft 28 interposed therebetween.

Meanwhile, the joint portion 33 is formed in a substantially U shape. That is, the joint portion 33 is formed such that a base portion 35 connected to the base end 26a of the arm bar 26 is integrated with two pawl portions 36 extending from both side of the base portion 35 toward the bearing holder 32. In addition, the pawl portions 36 are disposed respectively on the two flat surfaces 34 of the bearing holder 32. That is, the two pawl portions 36 sandwich the bearing holder 32.

In addition, shaft portions 37 are formed to project on the flat surfaces 34 of the bearing holder 32. The two shaft portions 37 formed in one bearing holder 32 are co-axially disposed. Furthermore, the two shaft portions 37 are provided such that the shaft portions are orthogonal to the connecting shaft 28.

Meanwhile, shaft holes 38 into which the shaft portions 37 can be inserted respectively are formed in the two pawl portions 36 of the joint portion 33. Accordingly, the joint portion 33 is connected to the bearing holder 32 such that the joint portion can freely turn with respect to the shaft portion 37 which is orthogonal to the connecting shaft 28.

The two small connection portions 29 configured as described above are disposed on both end sides of the connecting shaft 28. In addition, the connecting shaft 28 has collars 39 each of which is provided between the small connection portions 29 and the distal end 15b of the first arm 15. The collar 39 determines intervals between the small connection portions 29 and the distal end 15b of the first arm 15. Furthermore, bolts 45 are fastened to distal ends of the connecting shaft 28 via spacers 41.

Accordingly, a relative positional relation between the first arm 15, the connecting shaft 28, and the two small connection portions 29 is determined, and thus movements of the first arm 15, the connecting shaft 28, and the two small connection portions 29 in the shaft direction are restricted. Thus, the first arm 15 can freely turn with respect to the connecting shaft 28, and the second arm 16 can freely turn with respect to shaft portions 37 that are orthogonal to the connecting shaft 28.

The movable plate 12 is connected to distal ends 16b of the second arms 16, i.e., distal ends 26b of the arm bars 26, via second connection portions 18 such that the movable plate can freely turn. The movable plate 12 is formed in a trident shape. The movable plate 12 is constituted by a plate body 42 and three convex portions 46, which are molded in one piece, in an outer peripheral portion of the plate body 42 with equal intervals in a circumferential direction. In addition, lower ends of the link mechanisms 11 (the distal ends 16b of the second arm 16) are connected to the three convex portions 46 respectively via the second connection portions 18.

Figure 7:
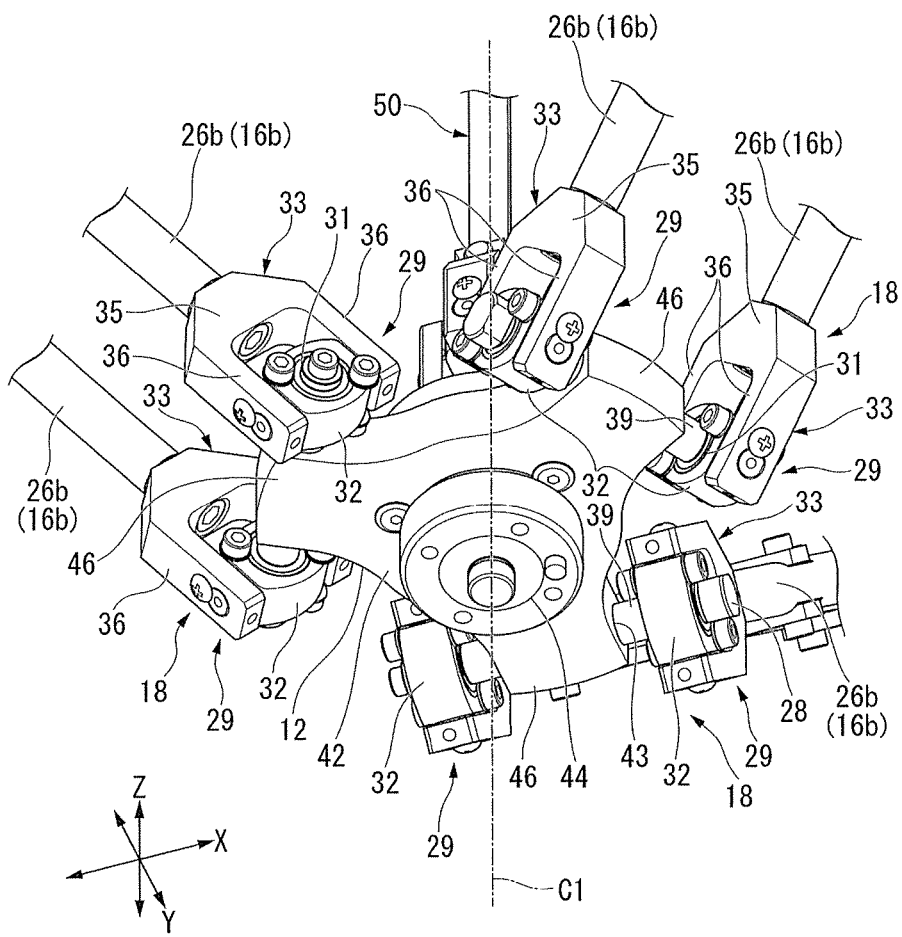
FIG. 7 is an enlarged diagram of a C portion of FIG. 3.

FIG. 7 is an enlarged diagram of a C portion of FIG. 3.

As illustrated in the drawing, a basic configuration of the second connection portions 18 is similar to that of the first connection portions 17. Thus, components of the second connection portions 18 the same as those of the first connection portions 17 are denoted by the same reference numerals and description thereof will not be repeated.

That is, each of the second connection portions 18 is mainly constituted by, in each of the convex portions 46 of the movable plate 12, a penetration hole 43 formed to penetrate each convex portion 46 in a circumferential direction, the connecting shaft 28 inserted into the penetration hole 43, and two small connection portions 29 each of which is provided at the distal end 26b of each arm bar 26 and connected to the connecting shaft 28. In addition, each of the small connection portions 29 includes a ball bearing 31 for supporting the connecting shaft 28 such that the connecting shaft can freely rotate, a substantially ring-shaped bearing holder 32 into which the ball bearing 31 is fitted, and a joint portion 33 which connects the bearing holder 32 to the distal end 26b of each arm bar 26 such that the members can freely turn.

As described above, a parallel mechanism is configured by connecting the movable plate 12 to the base plate 8 with the three link mechanisms 11. In addition, when the three link mechanisms 11 are driven, the movable plate 12 can move in three-dimensional directions (X-Y-Z directions) without changing attitudes (staying in the horizontal direction).

In addition, a rotation portion 44 is attached to the major part of the plate body 42 of the movable plate 12 in the center such that the rotation portion can freely rotate with respect to an axis set in a thickness direction of the plate body 42. The rotation portion 44 is connected to a lower end 57a of the rotation arm 57 of the rotational driving mechanism 51 via the universal joint 63. Furthermore, the lower end of the rotation portion 44 is designed such that a hand arm, which is not illustrated, can be attached thereto, and the hand arm can grab a workpiece, which is not illustrated.

In addition, a camera 70 for detecting a workpiece, which is not illustrated, is attached on the lower surface 8b of the base plate 8 on the other side 8d side using the bracket 71 as shown in FIG. 2 to FIG. 4. The bracket 71 is constituted by a horizontal bracket 72 projecting from the lower surface 8b of the base plate 8 to the other side 8d in the Y direction, and a vertical bracket 73 hanging from a distal end of the horizontal bracket 72. In addition, the camera 70 is attached to a lower end of the vertical bracket 73 such that the camera faces downward.

Figure 8:
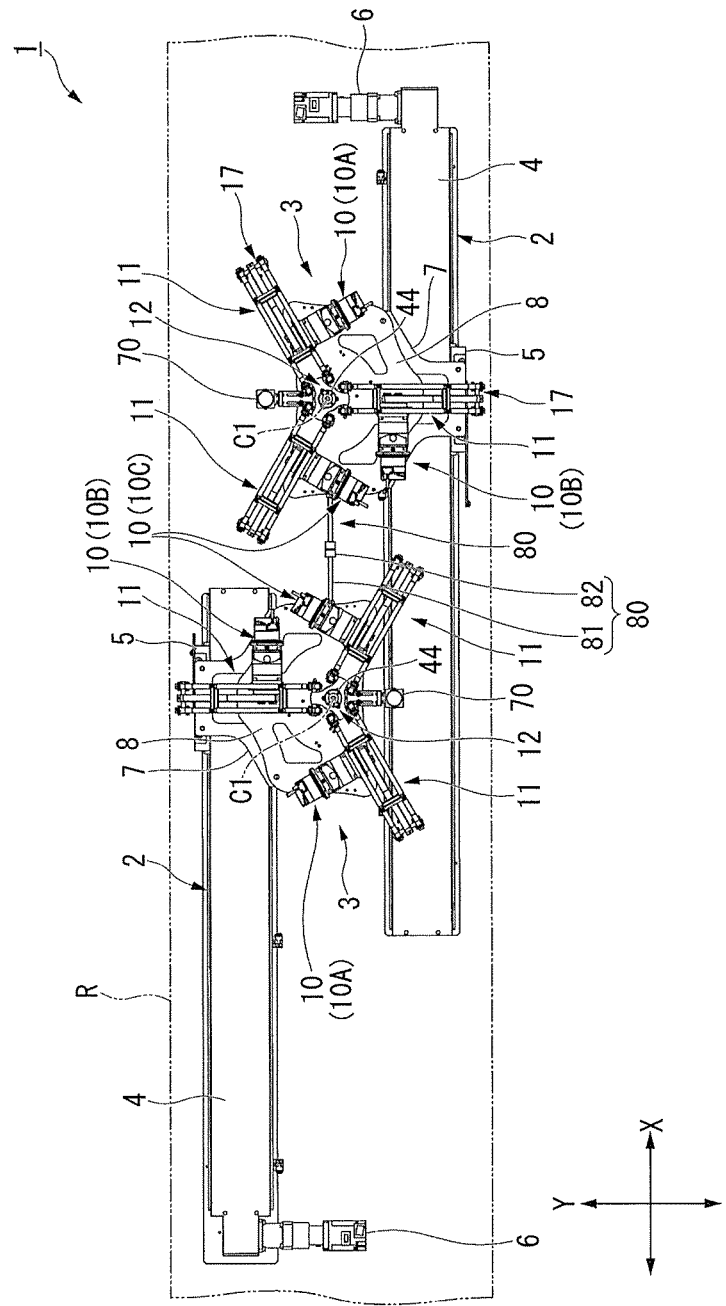
FIG. 8 is a plan view of the robot device according to the embodiment of the invention viewed from immediately below.

FIG. 8 is a plan view of the robot device 1 viewed from immediately below.

As shown in the drawing, the two parallel robots 3 separately installed on the slide rails 2 are disposed so that the orientations of the three provided link mechanisms 11 alternate. This will be described below in detail.

That is, the parallel robot 3 is attached to the mounting base 7 of the slide rail 2 on the side 8c of the base plate 8. The base plate 8 has the link mechanisms 11 attached thereto such that the other side 8d of the base plate 8 is positioned between the link mechanism 11 having the first lower motor with reduction gear 10A attached thereto and the link mechanism 11 having the third lower motor with reduction gear 10C attached thereto (refer to FIG. 4). Thus, the link mechanism 11 having the second lower motor with reduction gear 10B attached thereto is orthogonal to the slide rail 2 when viewed in the Z direction.

Here, the two slide rails 2 supporting the parallel robots 3 are disposed parallel to each other, and the mounting bases 7 thereof are disposed such that the mounting bases project in the direction in which the slide rails 2 face each other. Thus, the orientations of the three link mechanisms 11 provided in the adjacent parallel robots 3 alternate.

In addition, a line connecting the rotation centers C1 of the spur gear portions 58 (the rotation bodies 54) of the adjacent parallel robots 3 is set to be parallel to the two slide rails 2. For this reason, when any of the adjacent parallel robots 3 is used for one workpiece, which is not illustrated, on a production line, work (grabbing the workpiece using a hand arm, which is not illustrated) can be easily performed.

(Operation of Robot Device)

When the robot device 1 is operated to assemble a product using the above-described configuration, first, the cameras 70 of the parallel robots 3 image workpieces which are product components. Accordingly, positions and orientations of the workpieces are detected and results of the detection are output to a control unit, which is not illustrated, in the form of signals.

The control unit, which is not illustrated, controls driving of the parallel robots 3 based on the signals of the detection results from the camera 70. Specifically, the lower motors with reduction gears 10 are driven and the movable plates 12 are moved to a desired position. Then, the upper motors with reduction gear 50 are driven, directions of hand arms, which are not illustrated, attached to the movable plates 12 are changed to desired directions, and then the workpieces are grabbed by the hand arms.

After the workpieces are grabbed by the hand arms, which are not illustrated, the parallel robots 3 move along the slide rails 2, and the workpieces are conveyed to the next stage. That is, the workpieces are conveyed to a position corresponding to parallel robots 3 positioned on a downstream side of the production line. The parallel robots 3 positioned on the downstream side detect the workpieces conveyed from an upstream side using the cameras 70. Then, a similar operation to that of the above-described parallel robots 3 is performed. By repeating the operation, the assembly of the product is completed.

(Effects)

Here, the control unit, which is not illustrated, performs driving control of the slider motors with reduction gear 6 of the slide rails 2 while recognizing positions of the adjacent parallel robots 3. Thus, the stoppers 80 provided in the parallel robots 3 do not abut against each other in normal operations of the robot device 1.

Even if an erroneous operation occurs in movement of the parallel robots 3, the abutting portions 82 abut against each other before the two parallel robots 3 interfere with each other since the stoppers 80 are provided in the base plate 8. That is, even if the robot device 1 erroneously operates, the stoppers 80 play a failsafe role for preventing the link mechanisms 11 of the two parallel robots 3 from coming into contact with each other.

In addition, although the three link mechanisms 11 of each of the parallel robots 3 are disposed in the radial shape with respect to the rotation center C1 with equal intervals therebetween in the circumferential direction, the adjacent parallel robots 3 face in different directions, and thus a dead space between the parallel robots 3 can be reduced to be as small as possible. For this reason, interference of the link mechanisms 11 of the parallel robots 3 can be prevented while reducing the intervals of the parallel robots 3 to be as narrow as possible.

Moreover, the link mechanism 11 having the second lower motor with reduction gear 10B attached thereto among the three link mechanisms 11 is orthogonal to the slide rail 2 when viewed in the Z direction. Thus, the intervals of the parallel robots 3 can be set to be narrower more effectively. In addition, interference of the link mechanisms of each of the parallel robots 3 can be prevented more effectively as well.

Furthermore, the robot device 1 is disposed within the travel region R extending in one direction, and one parallel robot 3 is provided on each of the two slide rails 2 disposed parallel to each other. Thus, even if the parallel robots 3 are disposed side by side on a production line, driving control of the two parallel robots 3 can be simplified.

Moreover, the three lower motors with reduction gears 10 causing one link mechanism 11 to operate are disposed as described below. That is, the first lower motor with reduction gear 10A and the second lower motor with reduction gear 10B are disposed on the side surface 15c of the first arm 15 constituting each link mechanism 11. In addition, the third lower motor with reduction gear 10C is disposed on the other side surface 15d that is opposite to the side surface 15c of the first arm 15. Thus, a vacant space S (refer to FIG. 4) in which no lower motors with reduction gear 10 are present can be formed between the other side surface 15d of the first arm 15 having the first lower motor with reduction gear 10A attached thereto and the side surface 15c of the first arm 15 having the third lower motor with reduction gear 10C attached thereto.

By effectively using the vacant space S, an installation space for the parallel robots 3 can be reduced. That is, in the present embodiment, the other side 8d of the base plate 8 corresponding to the place at which the vacant space S is formed is set to be concave in comparison to other sides as if the other side were trimmed and the camera 70 is provided therein to detect workpieces, which are not illustrated. Thus, the installation space for the parallel robots 3 can be reduced without separately providing an installation space for the camera 70.

In addition, if the vacant space S is set to serve as a work space for an operator in which the operator can be positioned, the operator can get close to the parallel robots 3 accordingly, and thus he or she can easily perform maintenance work.

Furthermore, the other side 8d of the base plate 8 adjacent to the vacant space S is formed on the inward side of the straight line L1 (refer to FIG. 4), i.e., on the rotation center C1 side. Thus, the vacant space S can be formed to have a size which is as large as possible, and the installation space for the parallel robots 3 can be reduced to be as small as possible. In addition, workability for an operator can be improved to the maximum, and very convenient parallel robots 3 can be provided.

Furthermore, the camera 70 is employed as a detection means for detecting workpieces. Thus, workpieces, which are not illustrated, can be detected with high precision, and the parallel robots 3 having high performance can be provided.

In addition, while the arm-side pin insertion hole 22 is formed in the first arm 15 of each link mechanism 11, the bracket-side pin insertion hole 23 is formed in each bracket 9. Furthermore, the pin 24 can be inserted into and removed from this arm-side pin insertion hole 22 and bracket-side pin insertion hole 23. Thus, by fastening and fixing the first arm 15 to the brackets 9 with the pin 24 inserted into the holes, the position of the starting point of the first arm 15 with respect to the output shaft 14a of each of the lower motors with reduction gears 10 can be easily determined with high precision.

Furthermore, by inserting the pins 24 into the holes when the parallel robots 3 are not used or when the parallel robots 3 are transported to a production line, it is possible to prevent the link mechanisms 11 from needlessly moving.

In addition, the first connection portion 17 connecting the first arm 15 to the second arm 16 of each of the link mechanisms 11 is constituted by the penetration hole 27 formed on the distal end 15b side of the first arm 15 to penetrate the first arm, the connecting shaft 28 inserted into the penetration hole 27, and the two small connection portions 29 each connected to the connecting shaft 28. Furthermore, each of the small connection portions 29 is constituted by the ball bearing 31 for supporting the connecting shaft 28 such that the portions can freely rotate, the substantially ring-shaped bearing holder 32 into which the ball bearing 31 fits, and the joint portion 33 which connects the bearing holder 32 and the base end 26a of each arm bar 26 such that the members can freely turn. In addition, the joint portion 33 is connected to the bearing holder 32 such that the joint portion can freely turn with respect to the shaft portion 37 which is orthogonal to the connecting shaft 28. Thus, the first connection portion 17 can turn in two directions (around the connecting shaft 28 and around the shaft portion 37), and a range of motion of the link mechanism 11 can increase. Therefore, the parallel robots 3 having high performance can be provided.

In addition, the lower motors with reduction gears 10 for driving the link mechanisms 11 are provided on the lower surface 8b of the base plate 8 of the parallel robot 3. For this reason, only the upper motor with reduction gear 50 for driving the rotational driving mechanism 51 is disposed on the upper surface 8a of the base plate 8. Thus, a large vacant space can be formed over the upper surface 8a of the base plate 8. Therefore, the mounting base 7 provided on the slide rail 2 can be attached directly to the base plate 8, which facilitates installation of the parallel robot 3.

Here, it is assumed that the lower motors with reduction gears 10 are disposed on the upper surface 8a of the base plate 8 as in the related art. In this case, it is necessary to form a slit for avoiding interference of the link mechanisms 11 on the base plate 8. Thus, there is a possibility of the base plate 8 having weakened rigidity. However, by disposing the lower motors with reduction gears 10 and the link mechanisms 11 on the lower surface 8b side of the base plate 8, it is not necessary to form a slit on the base plate 8. Thus, the rigidity of the base plate 8 can be reliably secured.

Note that the invention is not limited to the above-described embodiment, and various modifications can be included in addition to the embodiment within the scope not departing from the gist of the invention.

In the above-described embodiment, for example, the case in which the two slide rails 2 are disposed parallel to each other in the travel region R and the parallel robots 3 are provided each on the slide rails 2 has been described. The invention, however, is not limited thereto, and one slide rail 2 may be provided in the travel region R and two parallel robots 3 may be provided on the slide rail 2. In addition, the number of parallel robots 3 is not limited to two, and two or more parallel robots may be provided. However, the orientations of the adjacent parallel robots 3 (the orientations of the three link mechanisms 11) need to be alternating.

In addition, a plurality of parallel robots 3 may be provided on each of the two slide rails 2. In this case, the orientations of the parallel robots 3 provided on one slide rail 2 is set to be all the same, and is set to be different from the orientations of the parallel robots 3 provided on the other slide rail 2. Then, the orientations of the adjacent parallel robots 3 alternate.

Here, since only the parallel robots 3 having the same orientation are provided on the same slide rail 2, if the orientations of the plurality of parallel robots 3 alternate, the intervals of the parallel robots provided on the same slide rail 2 can be set to be wide. Thus, assembly workability with respect to the entire robot device 1 can be improved.

Furthermore, the case in which the link mechanism 11 having the second lower motor with reduction gear 10B attached thereto among the three link mechanisms 11 of each parallel robot 3 is disposed to be orthogonal to the slide rail 2 when viewed in the Z direction has been described in the above-described embodiment. However, the invention is not limited thereto, and the orientations of the parallel robots 3 can be arbitrarily set. The orientations of the adjacent parallel robots 3, however, should alternate.

Since the orientations of the adjacent parallel robots 3 alternate, the intervals of the parallel robots 3 can be substantially narrower than in the case in which the orientations of all of the parallel robots 3 are the same.

In addition, the case in which the stopper 80 is provided in the base plate 8 for the failsafe function for preventing interference of the parallel robots 3 has been described in the above-described embodiment. In addition, the case in which the stopper 80 is constituted by the rod-shaped safety bar body 81 and the abutting portion 82 which is provided integrated with the distal end of the safety bar body 81 has been described. However, the invention is not limited thereto, and the stopper 80 may be configured to prevent the parallel robots 3 from interfering with each other.

Furthermore, the case in which the other side 8d of the base plate 8 is formed on the inward side of the straight line L1 (the rotation center C1 side) has been described in the above-described embodiment. However, the invention is not limited thereto, and the other side 8d of the base plate 8 may be formed on an outward side of the straight line L1. Also in this case, the orientation of the three lower motors with reduction gears 10 are set as in the above-described embodiment to form the vacant space S with respect to the base plate 8, and thus the vacant space S can be effectively used. For example, leg portions may be provided in the vacant space S to install the parallel robot 3 directly on a floor.

In addition, the case in which the lower motors with reduction gears 10 are disposed on the lower surface 8b side of the base plate 8 has been described in the above-described embodiment. However, the invention is not limited thereto, and the lower motors with reduction gears 10 may be disposed on the upper surface 8a of the base plate 8. However, the first lower motor with reduction gear 10A and the second lower motor with reduction gear 10B should be disposed on the side surface 15c of the first arm 15, and the third lower motor with reduction gear 10C should be disposed on the other side surface 15d of the first arm 15. With this configuration, the vacant space S can be formed with respect to the base plate 8.

Furthermore, the case in which the lower motors with reduction gears 10 are fixed to the lower surface 8b of the base plate 8 via the brackets 9 has been described in the above-described embodiment. However, a shape of each of the brackets 9 is not limited to that of the above-described embodiment, and can be configured to cause the lower motors with reduction gears 10 to be fixed to the lower surface 8b of the base plate 8. Also in this case, the first arms 15 of the link mechanisms 11 should be disposed radially with respect to the rotation center C1, the first lower motor with reduction gear 10A and the second lower motor with reduction gear 10B should be disposed on the side surface 15c of each first arm 15, and the third lower motor with reduction gear 10C should be disposed on the other side surface 15d of the first arm 15.

In addition, the case in which, while the arm-side pin insertion holes 22 are formed in the first arms 15 of the link mechanisms 11, the bracket-side pin insertion holes 23 are formed in the brackets 9 has been described in the above-described embodiment. In addition, the case in which the positions of the starting points of the first arms 15 with respect to the output shafts 14a of the lower motors with reduction gears 10 are determined using the pins 24 which can be inserted into and removed from the pin insertion holes 22 and 23 has been described. However, the invention is not limited thereto, and any configuration can be adopted as long as the positions (phases) of the starting points of the first arms 15 with respect to the output shafts 14a of the lower motors with reduction gears 10 can be adjusted.

In addition, the case in which the first connection portions 17 connecting the first arms 15 to the second arms of the link mechanisms 11 have the small connection portions 29 has been described in the above-described embodiment. Furthermore, the case in which each of the small connection portions 29 includes the ball bearing 31 for supporting the connecting shaft 28 such that the portions can freely rotate, and the substantially ring-shaped bearing holder 32 into which the ball bearing 31 fits has been described. However, instead of a separate ball bearing 31 and bearing holder 32, a configuration in which a holder which can support the connecting shaft 28 such that the connecting shaft can freely rotate and the holder and the second arm 16 are connected such that the second arm can freely turn may be adopted.

Furthermore, the case in which each of the second arms 16 has the two arm bars 26 each disposed on the side surfaces 15c and 15d of the first arm 15 and the two arm bars 26 are integrated with each other by the stay bolt 75 with the predetermined gap therebetween has been described in the above-described embodiment. However, the invention is not limited thereto, and the second arm 16 may be formed of one plate-shaped member like the first arm 15. In addition, conversely, the first arm 15 may be formed of two arm bars 26 and the like, like the second arm 16.

In addition, the case in which the camera 70 is provided as a detection means for detecting workpieces has been described in the above-described embodiment. However, the invention is not limited thereto, and any component that can detect workpieces may be adopted.

Furthermore, the case in which each of the lower motors with reduction gears 10 is constituted by the motor portion 13 and the speed reducing portion 14 has been described in the above-described embodiment. In addition, the case in which, for example, the planetary gear speed reducing mechanism is used as the speed reducing portion 14 has been described. However, the invention is not limited thereto, and only the motor portion 13 may be included. In this case, a driving shaft may be configured only with the rotation shaft of the motor portion 13, which is not illustrated.

Furthermore, when the motor portion 13 and the speed reducing portion 14 are used, a configuration in which the output shaft 14a of the speed reducing portion 14 and the rotation shaft of the motor portion 13, which is not illustrated, are disposed in the same direction may be employed. With this configuration, the orientation of each of the lower motors with reduction gears 10 can be restricted as in the above-described embodiment, and the vacant space S can be formed with respect to the base plate 8.

INDUSTRIAL APPLICABILITY

According to the above-described robot device, even when the plurality of parallel robots are disposed in the sliding direction in the travel region, interference of the link mechanisms of the parallel robots can be prevented while the intervals of the adjacent parallel robots can be set to be as narrow as possible.

What is claimed is:

1. A robot device comprising a plurality of parallel robots configured to be capable of slidably moving along a same travel region,
   wherein each of the parallel robots comprises:
   a base portion which is configured to be capable of slidably moving,
   three link mechanisms which are radially disposed on the base portion when viewed from a normal direction of the base portion,
   three driving units, which drive the three link mechanisms, are disposed in the base portion and separately connected on base end sides of the three link mechanisms, and
   a pair of stoppers, respectively disposed on two of the parallel robots adjacent to each other,
   wherein the pair of stoppers is disposed opposite to each other and configured on the base portions of the two of the parallel robots for preventing the link mechanisms of the two of the parallel robots from interfering with each other,
   wherein the plurality of parallel robots are disposed such that orientations of the three link mechanisms alternate,
   wherein the pair of the stoppers is a pair of safety bars extending toward each other from base portions of the two of the parallel robots adjacent to each other,
   wherein distal ends of the pair of safety bars of the two of the parallel robots are disposed to face each other and abut against each other.

2. The robot device according to claim 1, further comprising:
   two slide rails extending in a same direction and disposed parallel to each other in the travel region,
   wherein at least one of the base portion of the parallel robots is respectively configured to be capable of slidably moving on each of the two slide rails, and
   wherein only the parallel robots with the three link mechanisms having the same orientation are provided on the same slide rail.

3. The robot device according to claim 1, wherein one of the three link mechanisms is disposed in a direction orthogonal to a slide-movement direction of the parallel robots in the travel region when viewed in the normal direction of the base portion.

4. The robot device according to claim 2, wherein one of the three link mechanisms is disposed in a direction orthogonal to a slide-movement direction of the parallel robots in the travel region when viewed in the normal direction of the base portion.

5. The robot device according to claim 2, further comprising a plurality of stoppers configured on the base portion for preventing the link mechanisms of parallel robots that are adjacent to one another from coming in contact with each other.

6. The robot device according to claim 3, further comprising a plurality of stoppers configured on the base portion for preventing the link mechanisms of parallel robots that are adjacent to one another from coming in contact with each other.

7. The robot device according to claim 5,
   wherein the stoppers are safety bars extending from one to another base portion that are adjacent with each other, and
   wherein distal ends of the safety bars of the parallel robots that are adjacent to each other abut against each other.

8. The robot device according to claim 6,
   wherein the stoppers are safety bars extending from one to another base portion that are adjacent with each other, and
   wherein distal ends of the safety bars of the parallel robots that are adjacent to each other abut against each other.

* * * * *